United States Patent
Saito

(10) Patent No.: US 12,040,515 B2
(45) Date of Patent: Jul. 16, 2024

(54) MEMBRANE ELECTRODE ASSEMBLY

(71) Applicant: AGC Inc., Tokyo (JP)

(72) Inventor: Susumu Saito, Tokyo (JP)

(73) Assignee: AGC Inc., Tokyo (JP)

( * ) Notice: Subject to any disclaimer, the term of this patent is extended or adjusted under 35 U.S.C. 154(b) by 466 days.

(21) Appl. No.: 17/472,999

(22) Filed: Sep. 13, 2021

(65) Prior Publication Data

US 2022/0006111 A1 Jan. 6, 2022

Related U.S. Application Data

(63) Continuation of application No. PCT/JP2020/010940, filed on Mar. 12, 2020.

(30) Foreign Application Priority Data

Mar. 13, 2019 (JP) ................. 2019-046159

(51) Int. Cl.
| | | |
|---|---|---|
| *H01M 8/10* | (2016.01) | |
| *H01M 8/1004* | (2016.01) | |
| *H01M 8/1039* | (2016.01) | |
| *H01M 50/406* | (2021.01) | |
| *H01M 50/426* | (2021.01) | |
| *H01M 50/491* | (2021.01) | |
| *H01M 50/497* | (2021.01) | |

(52) U.S. Cl.
CPC ........ *H01M 8/1004* (2013.01); *H01M 8/1039* (2013.01); *H01M 50/406* (2021.01); *H01M 50/426* (2021.01); *H01M 50/491* (2021.01); *H01M 50/497* (2021.01); *H01M 2300/0082* (2013.01); *H01M 2300/0085* (2013.01)

(58) Field of Classification Search
CPC ............ H01M 8/1004; H01M 8/1018; H01M 8/1039; H01M 8/1016; H01M 8/1041; H01M 50/497; H01M 50/406; H01M 50/426; H01M 50/411; H01M 50/491; H01M 2300/0082; H01M 2300/0085
See application file for complete search history.

(56) References Cited

U.S. PATENT DOCUMENTS

| | | | | |
|---|---|---|---|---|
| 8,557,470 B2 * | 10/2013 | Terazono | ............ | H01M 8/1004 429/523 |
| 2007/0104994 A1 * | 5/2007 | Endoh | ................. | H01M 8/1093 429/492 |
| 2007/0134545 A1 * | 6/2007 | Deng | .................. | H01M 8/1004 429/530 |
| 2011/0008710 A1 | 1/2011 | Watakabe et al. | | |
| 2011/0027687 A1 | 2/2011 | Hommura et al. | | |
| 2016/0293987 A1 | 10/2016 | Okuyama et al. | | |
| 2017/0271689 A1 * | 9/2017 | Kono | ...................... | C22C 38/46 |
| 2017/0288249 A1 | 10/2017 | Hommura et al. | | |
| 2018/0131026 A1 | 5/2018 | Watabe et al. | | |

FOREIGN PATENT DOCUMENTS

| | | |
|---|---|---|
| EP | 1583106 A1 | 10/2005 |
| JP | 2009170244 A | 7/2009 |
| WO | WO 2016/104380 A1 | 6/2016 |

OTHER PUBLICATIONS

International Search Report issued Jun. 9, 2020 in PCT/JP2020/010940, filed on Mar. 12, 2020, 2 pages.

* cited by examiner

*Primary Examiner* — Raymond Alejandro
(74) *Attorney, Agent, or Firm* — Element IP, PLC

(57) ABSTRACT

To provide a membrane electrode assembly which can suppress cracking of the catalyst layers.
The membrane electrode assembly of the present invention is a membrane electrode assembly comprising an anode having a catalyst layer containing a proton-conductive polymer, a cathode having a catalyst layer containing a proton-conductive polymer, and a polymer electrolyte membrane disposed between the anode and the cathode, wherein the proton-conductive polymer contained in the catalyst layer of at least one of the anode and the cathode is a polymer (H) having units containing a cyclic ether structure and sulfonic acid-type functional groups, and the polymer electrolyte membrane contains a porous material containing a fluorinated polymer, and a fluorinated polymer (S) having sulfonic acid-type functional groups.

15 Claims, 1 Drawing Sheet

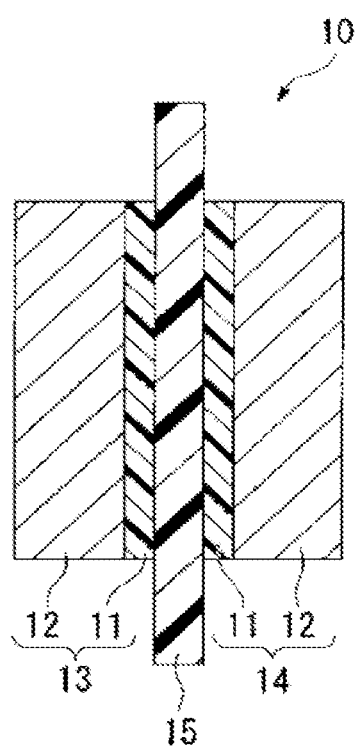

MEMBRANE ELECTRODE ASSEMBLY

TECHNICAL FIELD

The present invention relates to a membrane electrode assembly.

BACKGROUND ART

It is known that a membrane electrode assembly of a polymer electrolyte fuel cell comprises an anode having a catalyst layer containing a proton-conductive polymer, a cathode having a catalyst layer containing a proton-conductive polymer, and a polymer electrolyte membrane disposed between the above anode and cathode.

In Patent Document 1, it is disclosed that a proton-conductive polymer containing units having a cyclic ether structure, is used for a catalyst layer of an anode or a cathode.

Patent Document 1: WO2016/104380

DISCLOSURE OF INVENTION

Technical Problem

In recent years, polymer electrolyte fuel cells may be used for a long period of time, and therefore, there is a need to further improve the durability of the membrane electrode assemblies contained in these cells.

The present inventors have found that when a proton-conductive polymer containing units having a cyclic ether structure, as disclosed in Patent Document 1, is used in the catalyst layer, cracking of the catalyst layer may sometimes occur.

In view of the above situation, the present invention has an object to provide a membrane electrode assembly which can suppress cracking of the catalyst layer.

Solution to Problem

As a result of an extensive study on the above problem, the present inventors have found that in a case where a proton-conductive polymer contained in the catalytic layer of at least one of an anode and a cathode has units containing a cyclic ether structure and has sulfonic acid-type functional groups, it is possible to suppress cracking of the catalytic layer, by using a polymer electrolyte membrane which contains a porous material containing a fluorinated polymer, and a fluorinated polymer having sulfonic acid-type functional groups, and thus, have arrived at the present invention.

That is, the present inventors have found that the above problem can be solved by the following construction.

[1] A membrane electrode assembly comprising an anode having a catalyst layer containing a proton-conductive polymer and a catalyst, a cathode having a catalyst layer containing a proton-conductive polymer and a catalyst, and a polymer electrolyte membrane disposed between the anode and the cathode, characterized in that the proton-conductive polymer contained in said catalyst layer of at least one of said anode and said cathode is a polymer (H) having units containing a cyclic ether structure and having sulfonic acid-type functional groups, and the polymer electrolyte membrane contains a porous material containing a fluorinated polymer, and a fluorinated polymer (S) having sulfonic acid-type functional groups.

[2] The membrane electrode assembly according to [1], wherein the units containing a cyclic ether structure include at least one type of units selected from the group consisting of units represented by the after-mentioned formula (u12) and units represented by the after-mentioned formula (u22).

[3] The membrane electrode assembly according to [1] or [2], wherein the content of the units containing a cyclic ether structure is at least 30 mol % to the total units which the polymer (H) contains.

[4] The membrane electrode assembly according to any one of [1] to [3], wherein the ion exchange capacity of the polymer (H) is from 0.9 to 1.8 meq/g dry resin.

[5] The membrane electrode assembly according to any one of [1] to [4], wherein the TQ value of a precursor polymer (H) which is a polymer in which the sulfonic acid-type functional groups in the polymer (H) are groups which can be converted to sulfonic acid-type groups, is from 200 to 300° C.:

TQ value: It is the temperature at which the extrusion amount becomes 100 mm$^3$/sec when the precursor polymer (H) is melt-extruded under the condition of 2.94 MPa extrusion pressure by using a nozzle with a length of 1 mm and an inner diameter of 1 mm.

[6] The membrane electrode assembly according to any one of [1] to [5], wherein the fluorinated polymer (S) has at least one type of units selected from the group consisting of units represented by the formula (u31), units represented by the after-mentioned formula (u32) and units represented by the after-mentioned formula (u41).

[7] The membrane electrode assembly according to any one of [1] to [6], wherein the ion exchange capacity of the fluorinated polymer (S) is from 0.9 to 2.5 meq/g dry resin.

[8] The membrane electrode assembly according to any one of [1] to [7], wherein the TQ value of a precursor polymer (S) which is a polymer in which the sulfonic acid-type functional groups in the fluorinated polymer (S) are groups which can be converted to sulfonic acid-type groups, is from 200 to 350° C.:

TQ value: It is the temperature at which the extrusion amount becomes 100 mm$^3$/sec when the precursor polymer (S) is melt-extruded under the condition of 2.94 MPa extrusion pressure by using a nozzle with a length of 1 mm and an inner diameter of 1 mm.

[9] The membrane electrode assembly according to any one of [1] to [8], wherein the form of the porous material is a woven fabric, a non-woven fabric, a foam or a film.

[10] The membrane electrode assembly according to any one of [1] to [9], wherein the fluorinated polymer contained in the porous material is at least one member selected from the group consisting of polytetrafluoroethylene, a tetrafluoroethylene-hexafluoropropylene copolymer, and a tetrafluoroethylene-perfluoro(alkyl vinyl ether) copolymer.

[11] The membrane electrode assembly according to any one of [1] to [10], wherein the average pore diameter of the porous material is from 0.01 and 500 μm.

[12] The membrane electrode assembly according to any one of [1] to [11], wherein the average thickness of the porous material is from 1 and 300 μm.

[13] The membrane electrode assembly according to any one of [1] to [12], wherein the polymer (H) has units based on a perfluoromonomer and/or units based on tetrafluoroethylene (TFE).

[14] The membrane electrode assembly according to any one of [1] to [13], wherein the polymer (S) has units based on a perfluoromonomer and/or units based on tetrafluoroethylene (TFE).

[15] The membrane electrode assembly according to any one of [1] to [14], which is to be used in a polymer electrolyte fuel cell.

Advantageous Effects of Invention

According to the present invention, it is possible to provide a membrane electrode assembly which can suppress cracking of the catalyst layer.

BRIEF DESCRIPTION OF DRAWING

FIG. 1 is a cross-sectional view illustrating an example of the membrane electrode assembly of the present invention.

DESCRIPTION OF EMBODIMENTS

The meanings of terms in this invention are as follows.

A "unit" in a polymer means an atomic group formed by polymerization of a monomer and derived from a single molecule of the monomer. A unit may be an atomic group formed directly by the polymerization reaction, or may be an atomic group having part of the atomic group converted to another structure by processing the polymer obtained by the polymerization reaction. The content (mol %) of each unit to the total units contained in the polymer may be obtained by analyzing the polymer by nuclear magnetic resonance spectroscopy.

A "sulfonic acid-type functional group" means a sulfonic acid group ($-SO_3H$) or a sulfonic acid base ($-SO_3M^2$, where $M^2$ is an alkali metal or a quaternary ammonium cation).

A "precursor group" means a group which can be converted to a sulfonic acid group by hydrolysis, treatment for conversion to an acid type, or other treatment such as salt exchange to a metal cation.

A "precursor polymer" means a polymer in which the sulfonic acid-type functional groups are in the state of the precursor groups and which can be converted to a polymer having sulfonic acid-type functional groups.

A numerical value range represented by using "to" means a range which includes the numerical values listed before and after "to" as the lower and upper limit values.

Units represented by the formula (u11) are denoted as units (u11). Units represented by other formulas are denoted in the same way.

Further, a monomer represented by the formula (m11) is denoted as monomer (m11). Monomers represented by other formulas are denoted in the same way.

Further, a group represented by the formula (g1) is denoted as group (g1). Groups represented by other formulas are denoted in the same way.

The membrane electrode assembly comprises an anode having a catalyst layer containing a proton-conductive polymer and a catalyst, a cathode having a catalyst layer containing a proton-conductive polymer and a catalyst, and a polymer electrolyte membrane disposed between the above anode and the above cathode.

Further, the above proton-conductive polymer contained in the above catalyst layer of at least one of the above anode and cathode, is a polymer (H) having units containing a cyclic ether structure (hereinafter referred to also as "cyclic ether structure units"), and sulfonic acid-type functional groups.

Further, the polymer electrolyte membrane contains a porous material containing a fluorinated polymer, and a fluorinated polymer (S) having sulfonic acid-type functional groups (hereinafter referred to also as "polymer (S)"). The membrane electrode assembly of the present invention is suitable for use in a polymer electrolyte fuel cell.

According to the membrane electrode assembly of the present invention, cracking of the catalyst layer can be reduced. The details of the reason for this have not been clarified, but it is assumed to be due to the following reason.

The catalyst layer containing the polymer (H) having cyclic ether structural units tends to be stiffer than the catalyst layer containing acyclic structural units. Therefore, due to the stress difference between the polymer electrolyte membrane and the catalyst layer containing the polymer (H), the catalyst layer may sometimes be cracked.

With respect to such a problem, in a case where the polymer electrolyte membrane has a porous material containing a fluorinated polymer, it is considered that the porous material functions as a reinforcing material, whereby the above-mentioned stress difference is relaxed, and as a result, the occurrence of cracking of the catalyst layer has been suppressed.

FIG. 1 is a cross-sectional view illustrating an example of the membrane electrode assembly of the present invention. The membrane electrode assembly 10 has an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in contact with the catalyst layers 11.

In the following description, the anode and cathode may be collectively referred to as "electrodes".

[Electrodes (Anode and Cathode)]

Each of the anode 13 and cathode 14 has a catalyst layer 11 and a gas diffusion layer 12.

<Catalyst Layer>

It is sufficient that the proton-conductive polymer contained in at least one of the catalyst layer 11 which the anode 13 has and the catalyst layer 11 which the cathode 14 has, is the polymer (H), and both of the proton-conductive polymers may be the polymer (H). Here, in a case where the proton-conductive polymer contained in one of the catalyst layers 11 is the polymer (H) and the proton-conductive polymer contained in the other catalyst layer 11 is not a polymer (H), as the proton-conductive polymer contained in the latter catalyst layer 11, a polymer (S) as described below is preferred.

In the membrane electrode assembly of the present invention, from the viewpoint of gas permeability, it is preferred that the proton-conductive polymer in at least the cathode is the polymer (H).

The thickness of the catalyst layer is preferably from 1 to 20 μm, particularly preferably from 3 to 10 μm, since it is thereby possible to facilitate gas diffusion in the catalyst layer and to improve the power generation performance of the polymer electrolyte fuel cell.

The thickness of the catalyst layer is measured by observing the cross-section of the catalyst layer by e.g. a scanning electron microscope.

(Polymer (H))

The polymer (H) is a polymer having cyclic ether structural units and sulfonic acid-type functional groups.

The cyclic ether structural units preferably include at least one type of units selected from the group consisting of units (u11), units (u12), units (u13), units (u22), and units (u24) from such a viewpoint that a catalyst layer superior in oxygen permeability is obtainable; units (u12) and units (u22) are more preferred; and units (u22) are particularly preferred.

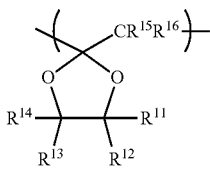

(u11)

$R^{11}$ is a monovalent perfluoroorganic group that may have an ether-bonding oxygen atom, a fluorine atom, or a group represented by —$R^{17}SO_2X(SO_2R^f)_a$-$M^+$.

As the monovalent perfluoroorganic group, a perfluoroalkyl group is preferred. In a case where the perfluoroalkyl group has an ether-bonding oxygen atom, the number of oxygen atoms may be one, or two or more. Further, the oxygen atom may be located between carbon-carbon atoms of the perfluoroalkyl group, or it may be located at the carbon atom bond terminal. The perfluoroalkyl group may be linear or branched, but linear is preferred.

$R^{17}$ is a divalent perfluoroorganic group which may have an ether-bonding oxygen atom. The organic group is a group having at least one carbon atom. As the divalent perfluoroorganic group, a perfluoroalkylene group is preferred. In a case where the perfluoroalkylene group has an ether-bonding oxygen atom, the number of oxygen atoms may be one, or two or more. Further, the oxygen atom may be located between carbon-carbon atoms of the perfluoroalkylene group or may be located at the carbon atom bond terminal. The perfluoroalkylene group may be linear or branched, but linear is preferred.

$M^+$ is $H^+$, a monovalent metal cation (e.g. potassium ion, sodium ion), or an ammonium ion in which at least one hydrogen atom may be substituted with a hydrocarbon group (e.g. a methyl group, an ethyl group); and from the viewpoint of high conductivity, $H^+$ is preferred.

$R^f$ is a linear or branched perfluoroalkyl group which may have an ether-bonding oxygen atom. The number of carbon atoms in the perfluoroalkyl group is preferably from 1 to 8, particularly preferably from 1 to 6. When having two or more $R^f$, the two or more $R^f$ may be the same or different from each other.

X is an oxygen atom, a nitrogen atom, or a carbon atom. When X is an oxygen atom, a in $(SO_2R^f)_a$ attached to X is 0; when X is a nitrogen atom, a in $(SO_2R^f)_a$ attached to X is 1; and when X is a carbon atom, a in $(SO_2R^f)_a$ attached to X is 2.

A specific example of the —$(SO_2X(SO_2R^f)_a)^-M^+$ group may be a sulfonic acid group (—$SO_3^-M^+$ group), a sulfonimide group (—$SO_2N(SO_2R^f)^-M^+$ group), or a sulfonemethide group (—$SO_2C(SO_2R^f)_2)^-M^+$ group).

$R^{12}$, $R^{13}$, $R^{15}$ and $R^{16}$ are each independently a monovalent perfluoroorganic group which may have an ether-bonding oxygen atom, or a fluorine atom. As the monovalent perfluoroorganic group, a perfluoroalkyl group is preferred. With respect to $R^{15}$ and $R^{16}$, at least one of them is preferably a fluorine atom, and it is particularly preferred that both of them are fluorine atoms.

$R^{14}$ is a monovalent perfluoroorganic group which may have an ether-bonding oxygen atom, a fluorine atom, or a group represented by —$R^{17}SO_2X(SO_2R^f)_a$-$M^+$. As the monovalent perfluoroorganic group, a perfluoroalkyl group is preferred. In a case where the perfluoroalkyl group has an ether-bonding oxygen atom, the number of oxygen atoms may be one, or two or more. The oxygen atom may be located between carbon-carbon atoms of the perfluoroalkyl group, or it may be located at the carbon atom bond terminal. The perfluoroalkyl group may be linear or branched, but linear is preferred.

In the formula (u11), when two or more $R^{17}$, X, $R^f$, a and $M^+$ are contained, the two or more $R^{17}$, X, $R^f$, a and $M^+$ may be the same or different from each other.

The units (u11) are preferably units (u11-1) or units (u11-2).

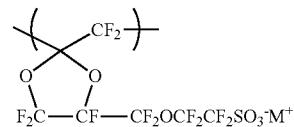

(u11-1)

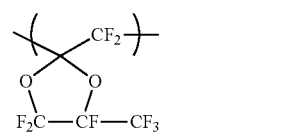

(u11-2)

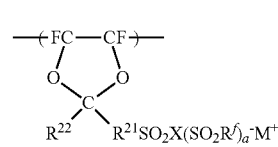

(u12)

$R^{21}$ is a $C_{1-6}$ perfluoroalkylene group or a $C_{2-6}$ perfluoroalkylene group having an ether-bonding oxygen atom between carbon-carbon atoms. In a case where the perfluoroalkylene group has an ether-bonding oxygen atom, the number of oxygen atoms may be one, or two or more. The perfluoroalkylene group may be linear or branched, but linear is preferred.

$R^{22}$ is a fluorine atom, a $C_{1-6}$ perfluoroalkyl group, a $C_{2-6}$ perfluoroalkyl group having an ether-bonding oxygen atom between carbon-carbon atoms, or a group represented by —$R^{21}(SO_2X(SO_2R^f)_a)^-M^+$. In a case where the perfluoroalkyl group has an ether-bonding oxygen atom, the number of oxygen atoms may be one, or two or more. The perfluoroalkyl group may be linear or branched, but linear is preferred. In the formula (u12), when two $R^{21}$ are contained, the two $R^{21}$ may be the same or different from each other.

$M^+$, $R^f$, X and a are synonymous with $M^+$, $R^f$, X and a in the formula (u11), respectively.

Specific examples of units (u12) may be units (u12-1) and units (u12-2). In the formulas, $M^+$ is synonymous with $M^+$ in the formula (u11).

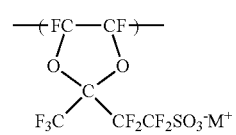

(u12-1)

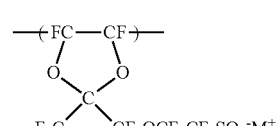

(u12-2)

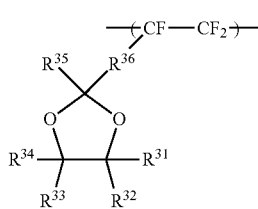
(u13)

$R^{31}$ is a fluorine atom, a $C_{1-6}$ perfluoroalkyl group, a $C_{2-6}$ perfluoroalkyl group having an ether-bonding oxygen atom between carbon-carbon atoms, or a group represented by —$R^{37}SO_2X(SO_2R^f)_a{}^-M^+$.

In a case where the perfluoroalkyl group has an ether-bonding oxygen atom, the number of oxygen atoms may be one, or two or more. The perfluoroalkyl group may be linear or branched, but linear is preferred.

$R^{37}$ is a $C_{1-6}$ perfluoroalkylene group or a $C_{2-6}$ perfluoroalkylene group having an ether-bonding oxygen atom between carbon-carbon atoms. In a case where the perfluoroalkylene group has an ether-bonding oxygen atom, the number of oxygen atoms may be one, or two or more. The perfluoroalkylene group may be linear or branched, but linear is preferred.

$R^{32}$ to $R^{35}$ are each independently a fluorine atom, a $C_{1-6}$ perfluoroalkyl group, or a $C_{2-6}$ perfluoroalkyl group having an ether-bonding oxygen atom between carbon-carbon atoms. In a case where the perfluoroalkyl group has an ether-bonding oxygen atom, the number of oxygen atoms may be one, or two or more. The perfluoroalkyl group may be linear or branched, but linear is preferred.

$R^{36}$ is a single bond, a $C_{1-6}$ perfluoroalkylene group, or a $C_{2-6}$ perfluoroalkylene group having an ether-bonding oxygen atom between carbon-carbon atoms. In a case where the perfluoroalkylene group has an ether-bonding oxygen atom, the number of oxygen atoms may be one, or two or more. The perfluoroalkylene group may be linear or branched, but linear is preferred.

$M^+$, $R^f$, $X$ and $a$ are synonymous with $M^+$, $R^f$, $X$ and $a$ in the formula (u11), respectively.

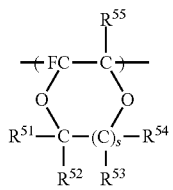
(u22)

s is 0 or 1, and 0 is preferred.

$R^{51}$ and $R^{52}$ are each independently a fluorine atom, a $C_{1-5}$ perfluoroalkyl group, or a spiro ring formed by linking of them together (when s is 0).

$R^{53}$ and $R^{54}$ are each independently a fluorine atom or a $C_{1-5}$ perfluoroalkyl group.

$R^{55}$ is a fluorine atom, a $C_{1-5}$ perfluoroalkyl group, or a $C_{1-5}$ perfluoroalkoxy group. $R^{55}$ is preferably a fluorine atom from the viewpoint of its high polymerization reactivity.

The perfluoroalkyl and perfluoroalkoxy groups may be linear or branched, but linear is preferred.

The units (u22) are preferably units (u22-1).

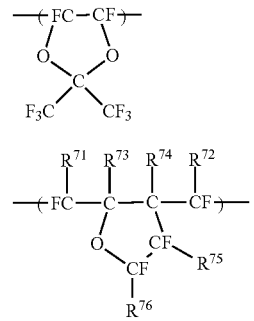
(u22-1)

(u24)

$R^{71}$ to $R^{76}$ are each independently a monovalent perfluoroorganic group which may have an ether-bonding oxygen atom, or a fluorine atom. As the monovalent perfluoroorganic group, a perfluoroalkyl group is preferred. In a case where the perfluoroalkyl group has an ether-bonding oxygen atom, the number of oxygen atoms may be one, or two or more. The oxygen atom may be inserted between carbon-carbon atoms of the perfluoroalkyl group, or it may be inserted at the carbon atom bond terminal. The perfluoroalkyl group may be linear or branched, but linear is preferred.

$R^{71}$ to $R^{74}$ are preferably fluorine atoms from the viewpoint of their high polymerization reactivity.

The content of the cyclic ether structural units is preferably at least 30 mol %, more preferably at least 40 mol %, further preferably at least 50 mol %, particularly preferably at least 70 mol %, to the total units contained in the polymer (H), from such a viewpoint that the power generation efficiency of the fuel cell will be superior.

The upper limit value of the content of the cyclic ether structural units is preferably 100 mol %, particularly preferably 80 mol %, to the total units contained in the polymer (H).

The polymer (H) may contain only one type of specific cyclic ether structural units, or two or more types. In the case of containing two or more types, the above content means the total amount of them.

The polymer (H) may also have units based on a perfluoromonomer. However, the units based on a perfluoromonomer described above do not contain a cyclic ether structure and have units having a sulfonic acid-type functional group.

As the units based on a perfluoromonomer, units (u31), units (u32) and units (u41) may be mentioned, and from such a viewpoint that the power generation efficiency of the fuel cell will be superior, units (u32) and units (u41) are preferred.

(u31)

Z is a fluorine atom or a trifluoromethyl group, q is 0 or 1, m is an integer of from 0 to 3, p is 0 or 1, n is an integer of from 1 to 12, and m+p>0.

$M^+$ is synonymous with $M^+$ in the above-described formula (u11).

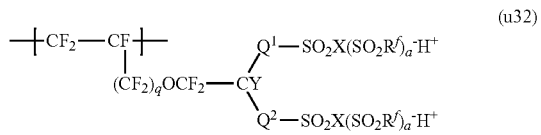

(u32)

Q[1] is a perfluoroalkylene group which may have an ether-bonding oxygen atom.

Q[2] is a single bond or a perfluoroalkylene group which may have an ether-bonding oxygen atom.

In a case the perfluoroalkylene groups of Q[1] and Q[2] have ether-bonding oxygen atoms, the number of oxygen atoms may be one, or two or more. The oxygen atom may be located between carbon-carbon atoms of the perfluoroalkylene group, or it may be located at the carbon atom bond terminal.

The perfluoroalkylene group may be linear or branched, but linear is preferred. The number of carbon atoms in the perfluoroalkylene group is preferably from 1 to 6, particularly preferably from 1 to 4. When the number of carbon atoms is at most 6, the boiling point of the fluorinated monomer as the raw material becomes lower, whereby distillation and purification become easier. Further, when the number of carbon atoms is at most 6, the decrease in the ion exchange capacity of the polymer (H) is suppressed, whereby the proton conductivity becomes good.

It is preferred that Q[2] is a $C_{1-6}$ perfluoroalkylene group which may have an ether-bonding oxygen atom. When Q[2] is a $C_{1-6}$ perfluoroalkylene group which may have an ether-bonding oxygen atom, the stability of the power generation performance will be excellent when the fuel cell is operated over a long period of time, as compared to a case where Q[2] is a single bond.

At least one of Q[1] and Q[2] is preferably a $C_{1-6}$ perfluoroalkylene group having an etheric oxygen atom. A monomer having a $C_{1-6}$ perfluoroalkylene group having an etheric oxygen atom, can be synthesized without undergoing a fluorination reaction with fluorine gas, whereby the yield will be good, and the production will be easy.

Y is a fluorine atom or a monovalent perfluoroorganic group. Y is preferably a fluorine atom or a $C_{1-6}$ linear perfluoroalkyl group which may have an etheric oxygen atom.

q is 0 or 1.

$R^f$, X and a are synonymous with $R^f$, X and a in the above-mentioned formula (u11). When two or more $R^f$, a and X are contained, the two or more $R^f$, a and X may be the same or different from each other.

As the units (u32), from such a viewpoint that the production is easy and the industrial implementation is easy, units (u32-1) to (u32-3) are preferred, and units (u32-1) are particularly preferred.

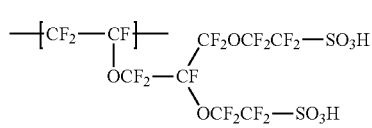

(u32-1)

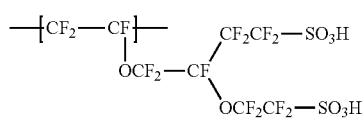

(u-32-2)

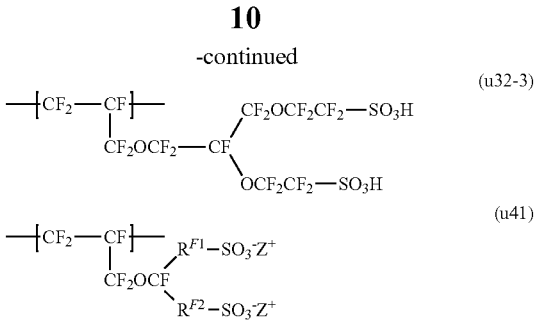

$R^{F1}$ and $R^{F2}$ are each independently a $C_{1-3}$ perfluoroalkylene group.

As specific examples of $R^{F1}$ and $R^{F2}$, —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$— and —$C(CF_3)(CF_3)$— may be mentioned. From such a viewpoint that raw materials are cheaper, and the production is easy, and the ion exchange capacity can be made to be higher, $R^{F1}$ and $R^{F2}$ are preferably $C_{1-2}$, and linear is preferred. Specifically, —$CF_2$—, —$CF_2CF_2$—, or —$CF(CF_3)$— is preferred, and —$CF_2$— is particularly preferred.

$Z^+$ is $H^+$, a monovalent metal cation (e.g. potassium ion, sodium ion), or an ammonium ion in which at least one hydrogen atom may be substituted with a hydrocarbon group (e.g. a methyl group, an ethyl group), and from the viewpoint of the high conductivity, $H^+$ is preferred. The two $Z^+$ may be the same or different from each other.

The content of the units based on a perfluoromonomer is preferably from 5 to 40 mol %, more preferably from 10 to 35 mol % is, particularly preferably from 15 to 30 mol %, to the total units contained in the polymer (H).

The polymer (H) may contain only one type of perfluoromonomer-based units or two or more types. In a case where it contains two or more types, the above content means the total amount of them.

The polymer (H) may further contain units based on tetrafluoroethylene (TFE). Water repellency will thereby be imparted, whereby drainage of water in the catalyst layer will be increased, and the power generation efficiency of the fuel cell will be improved.

The content of the units based on tetrafluoroethylene is preferably from 0 to 40 mol %, more preferably from 5 to 35 mol %, particularly preferably from 5 to 30 mol %, to the total units contained in the polymer (H).

The polymer (H) may contain units other than the above-described ones (hereinafter referred to also as "other units"). Specific examples of such other units may be units based on monomers such as perfluoro(3-butenyl vinyl ether), perfluoro(allyl vinyl ether), perfluoro α-olefins (such as hexafluoropropylene, etc.) and perfluoro(alkyl vinyl ethers).

A preferred embodiment of the polymer (H) is an embodiment containing units (u22), since the power generation efficiency of the fuel cell will be superior.

Further, a more preferred embodiment of the polymer (H) is an embodiment containing units (u22) and at least one of units (u11) and units (u12), from such a viewpoint that the power generation efficiency of the fuel cell will be particularly excellent.

Further, another more preferred embodiment of the polymer (H) is an embodiment containing unit (u22), units based on a perfluoromonomer and units based on tetrafluoroethylene, from such a viewpoint that the power generation efficiency of the fuel cell will be particularly excellent.

The ion exchange capacity of the polymer (H) is preferably from 0.9 to 1.8 meq/g dry resin, more preferably from 1.0 to 1.7 meq/g dry resin, particularly preferably from 1.0 to 1.6 meq/g dry resin.

When the ion exchange capacity is at least the lower limit value in the above range, the ionic conductivity of the polymer (H) becomes to be high, whereby in a case where the membrane electrode assembly is applied to a polymer electrolyte fuel cell, a sufficient battery power can be obtained. When the ion exchange capacity is at most the upper limit value in the above range, in a case where the membrane electrode assembly is applied to a polymer electrolyte fuel cell, flooding of the polymer electrolyte fuel cell can be suppressed.

The ion exchange capacity of the polymer (H) is obtainable by the method as described in the section for Examples given later.

The TQ value (volume flow rate) of a precursor polymer (H) of the polymer (H) is preferably from 200 to 300° C., more preferably from 220 to 300° C., particularly preferably from 240 to 290° C.

When the TQ value is at least the lower limit value in the above range, the polymer (H) will have a sufficient molecular weight and will be excellent in mechanical strength. When the TQ value is at most the upper limit value in the above range, the solubility or dispersibility of the polymer (H) will be improved, whereby it will be easier to prepare a liquid composition containing the polymer (H). The TQ value is an index for the molecular weight of the polymer (H).

The TQ value of the precursor polymer (H) is measured by the method as described in the section for Examples given later.

(Method for Producing Polymer (H))

The polymer (H) is produced, for example, by converting precursor groups of a polymer having precursor groups of sulfonic acid-type functional groups, obtainable by polymerizing at least a specific cyclic monomer, to sulfonic acid-type functional groups.

Each monomer which may be used in the production of the polymer (H) will be described below.

Units (u11) are obtainable by polymerizing a monomer (m11), and suitable embodiments of the monomer (m11) may be monomers (m11-1) to (m11-6). Here, the monomer (m11) can be synthesized by known methods.

In the formula (m11), $R^{110}$ is a monovalent perfluoroorganic group which may have an ether-bonding oxygen atom, a fluorine atom, or a group represented by $-R^{17}SO_2F$. $R^{17}$ is synonymous with $R^{17}$ in the formula (u11).

$R^{12}$ to $R^{16}$ in the formula (m11) are synonymous with $R^{11}$ to $R^{16}$ in the formula (u11), respectively.

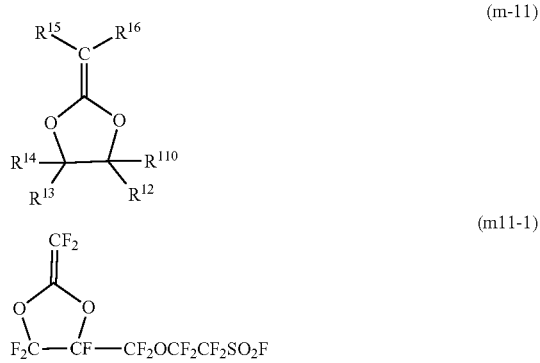

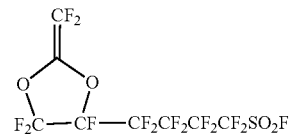

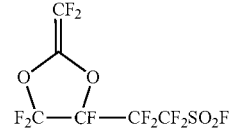

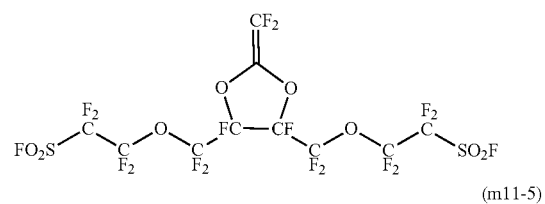

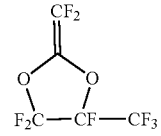

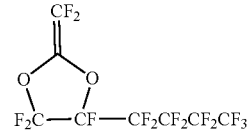

Units (u12) are obtainable by polymerizing a monomer (m12), and suitable embodiments of the monomer (m12) may be monomers (m12-1) and (m12-2). Here, the monomer (m12) can be synthesized by known methods.

$R^{21}$ and $R^{22}$ in the formula (m12) are synonymous with $R^{21}$ and $R^{22}$ in the formula (u12), respectively.

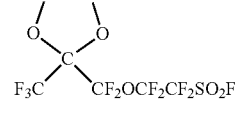

Units (u13) are obtainable by polymerizing a monomer (m13), and suitable embodiments of the monomer (m13) may be monomers (m13-1) to (m13-4). The monomer (m13) can be synthesized by known methods.

$R^{310}$ in the formula (m13) is a fluorine atom, a $C_{1-6}$ perfluoroalkyl group, a $C_{2-6}$ perfluoroalkyl group having an ether-bonding oxygen atom between carbon-carbon atoms, or a group represented by —$R^{37}SO_2F$. $R^{37}$ is synonymous with $R^{37}$ in the formula (u13).

$R^{32}$ to $R^{36}$ in the formula (m13) are synonymous with $R^{32}$ to $R^{36}$ in the formula (u13).

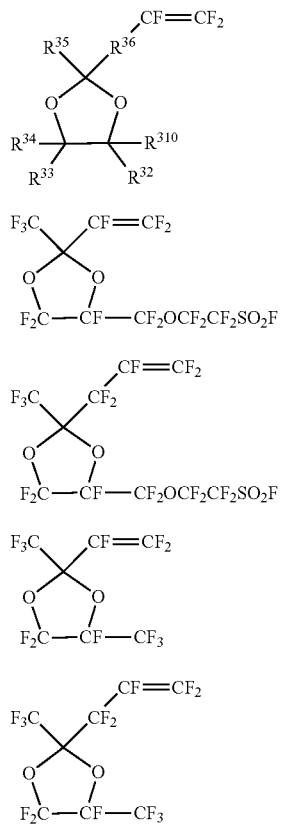

Units (u22) are obtainable by polymerizing a monomer (m22), and suitable embodiments of the monomer (m22) may be monomers (m22-1) and (m22-11). The monomer (m22) can be synthesized by known methods.

$R^{51}$ to $R^{55}$ and s in the formula (m22) are synonymous with $R^{51}$ to $R^{55}$ and s in the formula (u22), respectively.

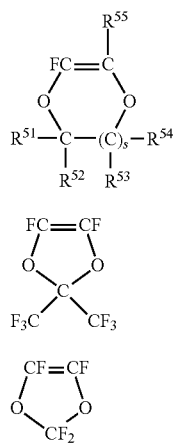

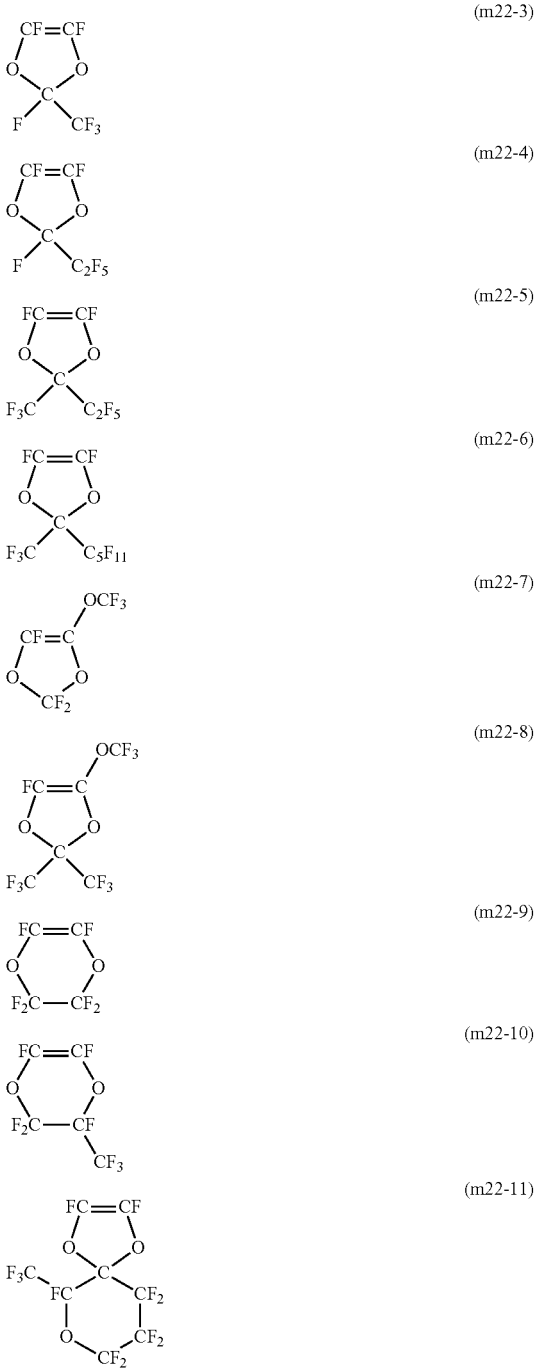

Units (u24) are obtainable by cyclization polymerization of a monomer (m24), and suitable embodiments of the monomer (m24) may be monomers (m24-1) to (m24-3). The monomer (m24) can be synthesized by known methods.

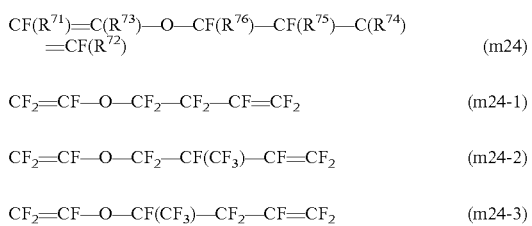

In the production of the polymer (H), a perfluoromonomer which does not contain a cyclic ether structure and contains a precursor group of a sulfonic acid-type functional group, may be used.

The perfluoromonomer may be monomer (m31), monomer (m32), and monomer (m41), and from such a viewpoint that the power generation efficiency of the fuel cell will be superior, monomer (m32) and monomer (m41) are preferred.

$$CF_2=CF(CF_2)q(OCF_2CFZ)_mO_p(CF_2)_nSO_2F \qquad (m31)$$

The monomer (m31) corresponds to units (u31).

Z, q, m, p and n are synonymous with Z, q, m, p and n in the formula (u31), respectively.

As the monomer (m31), monomers (m31-1) to (m31-3) are preferred.

$$CF_2=CFO(CF_2)_{n1}SO_2F \qquad (m31-1)$$

$$CF_2=CFOCF_2CF(CF_3)O(CF_2)_{n2}SO_2F \qquad (m31-2)$$

$$CF_2=CF(OCF_2CF(CF_3))_{m3}O(CF_2)_{n3}SO_2F \qquad (m31-3)$$

$$CF_2=CFCF_2O(CF_2)_{n4}SO_2F \qquad (m31-4)$$

Here, n1, n2, n3 and n4 are integers from 1 to 8, and m3 is an integer of from 1 to 3.

The monomer (m31) may be synthesized, for example, by the method as described in Prog. Polym. Sci., Vol. 12, 1986, p. 233-237; U.S. Pat. No. 4,330,654; etc.

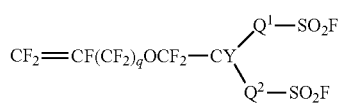

$Q^1$, $Q^2$, Y and q are synonymous with $Q^1$, $Q^2$, Y and q in the formula (u32), respectively.

The monomer (m32) corresponds to units (u32).

As the monomer (m32), from such a viewpoint that the production of the polymer (H) will be easy and the industrial implementation will be easy, monomers (m32-1) to (m32-3) are preferred, and monomer (m32-1) is particularly preferred.

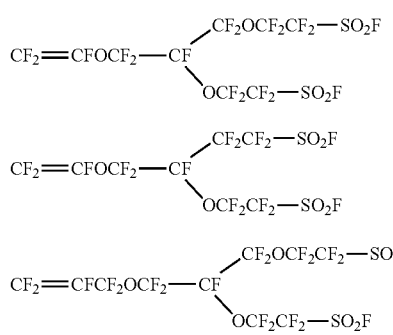

The monomer (m32) may be synthesized, for example, by the method as described in WO2007/013533 pamphlet, JP-A-2008-202039, etc.

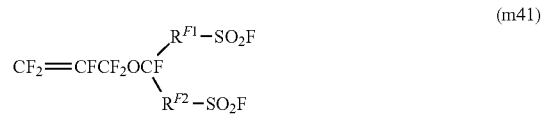

The monomer (m41) corresponds to units (u41).

$R^{F1}$ and $R^{F2}$ are synonymous with $R^{F1}$ and $R^{F2}$ in the formula (u41), respectively.

As a specific example of the monomer (m41), monomer (m41-1) may be mentioned.

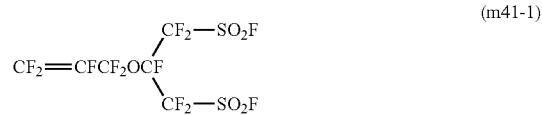

The monomer (m41) may be produced, for example, by the method as described in the section for Examples given later.

In the production of the polymer (H), tetrafluoroethylene may be used.

In the production of the polymer (H), monomers other than the above-mentioned ones may be used. Specific examples of such other monomers may be perfluoro(3-butenyl vinyl ether), perfluoro(allyl vinyl ether), perfluoro α-olefins (such as hexafluoropropylene, etc.), and perfluoro (alkyl vinyl ethers).

The conversion of the precursor groups (—SO$_2$F) to sulfonic acid-type functional groups may be carried out by known methods.

Further, the polymer (H), in which the sulfonic acid-type functional groups are sulfonimide groups, can be produced also by polymerizing the monomer (m11), (m12), (m13), (m31), (m32) or (m41), in which the group represented by —SO$_2$F is converted to a sulfonimide group, and the monomer (m24).

The monomer in which the group represented by —SO$_2$F is converted to a sulfonimide group, can be produced by adding chlorine or bromine to the carbon-carbon double bond of the monomer (m11), (m12), (m13), (m32) or (m41) to convert the group represented by —SO$_2$F to a sulfonimide group, followed by a dechlorination or debromination reaction using metallic zinc.

(Catalyst)

The catalyst contained in the catalyst layer is, for example, a supported catalyst in which platinum or a platinum alloy is supported on a carbon carrier.

Specific examples of the carbon carrier may be carbon black powder, graphitized carbon, carbon fibers, and carbon nanotubes.

The platinum alloy is preferably an alloy of platinum with at least one type of metal selected from the group consisting of platinum group metals excluding platinum (ruthenium, rhodium, palladium, osmium, iridium), gold, silver, chromium, iron, titanium, manganese, cobalt, nickel, molybdenum, tungsten, aluminum, silicon, zinc and tin.

In the case of using a supported catalyst, the supported amount of the catalyst is, from the viewpoint of superior power generation efficiency of the fuel cell and cost, preferably from 10 to 80 mass %, particularly preferably from 10 to 70 mass % to the total mass of the supported catalyst.

In the case of using a supported catalyst, the ratio of the mass of the polymer (H) to the mass of the carrier (the content of the polymer (H)/the content of the carrier) is, from the viewpoint of excellent power generation efficiency of the fuel cell, preferably from 0.5 to 2.0, particularly preferably from 0.6 to 1.8.

<Gas Diffusion Layer>

The gas diffusion layer 12 has a function to uniformly diffuse gas in the catalyst layer 11 and a function as a current collector.

As the gas diffusion layer 12, carbon paper, carbon cloth, carbon felt, etc. may be mentioned. It is preferred that the gas diffusion layer 12 is treated for water-repellency by polytetrafluoroethylene or the like.

Further, in the membrane electrode assembly 10 in FIG. 1, the gas diffusion layer 12 is contained, but the gas diffusion layer is an optional component and may not be contained in the membrane electrode assembly.

<Another Component>

The anode 13 and cathode 14 may have another component other than the above-described ones.

As a specific example of another component, a carbon layer (not shown) to be provided between the catalyst layer 11 and the gas diffusion layer 12 may be mentioned. If the carbon layer is disposed, the gas diffusivity of the surface of the catalyst layer 11 will be improved, and the power generation performance of the fuel cell can be further improved.

The carbon layer may contain, for example, carbon and a nonionic fluorinated polymer. A specific example of carbon is preferably carbon nanofibers having a fiber diameter of from 1 to 1,000 nm and a fiber length of at most 1,000 μm. A specific example of the nonionic fluorinated polymer may be polytetrafluoroethylene.

<Method for Forming Catalyst Layer>

The formation of the catalytic layer 11 may be carried out by using known methods.

[Polymer Electrolyte Membrane]

The polymer electrolyte membrane 15 is a membrane containing a porous material containing a fluorinated polymer, and a polymer (S).

The thickness of the polymer electrolyte membrane is preferably from 1 to 200 μm, particularly preferably from 5 to 100 μm.

The thickness of the polymer electrolyte membrane is measured by observing the cross section of the polymer electrolyte membrane by a scanning electron microscope.

<Porous Material>

The porous material means a member having a large number of pores in the thickness direction. The pores are preferably penetrating in the thickness direction.

The form of the porous material is preferably in the form of a sheet, and specifically woven fabric, non-woven fabric, foam and film may be mentioned. Among them, from such a viewpoint that the effect of the present invention will be superior, a film (porous film) is preferred, and a film having pores formed by a stretching method is particularly preferred.

The porous material is contained, for example, at the surface or inside of the polymer electrolyte membrane.

The porous material contains a fluorinated polymer. The fluorinated polymer means a polymer having fluorine atoms.

Specific examples of the fluorinated polymer may be polytetrafluoroethylene, a tetrafluoroethylene-hexafluoropropylene copolymer and a tetrafluoroethylene-perfluoro (alkyl vinyl ether) copolymer. Among them, polytetrafluoroethylene is preferred from such a viewpoint that the effect of the present invention will be superior, and from the viewpoint of the mechanical and chemical durability. The porous material may contain only one type, or two or more types of the fluorinated polymer.

As the porous material, a commercially available product may be used, and, for example, Tetratex II 3108 (manufactured by Donaldson Company, Inc.) may be mentioned.

The average pore diameter of the porous material is preferably from 0.01 to 500 μm, particularly preferably from 0.05 to 250 μm. When the average pore diameter of the porous material is at least the lower limit value, the performance of the membrane electrode assembly can be maintained to be at a good level. When the average pore diameter of the porous material is at most the upper limit value, the strength of the porous material can be improved, and the stress difference between the polymer electrolyte membrane and the catalytic layer containing the polymer (H) can be reduced more, whereby occurrence of cracking in the catalyst layer can be suppressed more.

The average pore diameter of the porous material can be measured by the bubble point method (JIS K3832).

The average thickness of the porous material is preferably from 1 to 300 μm, particularly preferably from 5 to 100 μm, from such a viewpoint that while maintaining the performance of the membrane electrode assembly to be at a good level, it is possible to better suppress occurrence of cracking in the catalyst layer.

The average thickness of the porous material is calculated as the arithmetic mean value of the thicknesses measured at four arbitrary locations using a Digimatic indicator (manufactured by Mitutoyo Corporation, 543-250, flat measurement terminal: 5 mm in diameter).

<Polymer (S)>

The polymer (S) is a fluorinated polymer having sulfonic acid-type functional groups to be contained in the polymer electrolyte membrane.

The polymer (S) may be any polymer which has sulfonic acid-type functional groups and has fluorine atoms, but from such a viewpoint that the chemical durability is high, it is preferred to have units based on the above-mentioned perfluoromonomer which can be included in the polymer (H).

Specific examples of the units based on the perfluoromonomer in the polymer (S) may be units (u31), units (u32) and units (u41), and from such a viewpoint that the power generation efficiency of the fuel cell will be superior, units (u32) and units (u41) are preferred, and units (u32) are particularly preferred.

The content of the units based on the perfluoromonomer is preferably from 5 to 40 mol %, more preferably from 10 to 35 mol %, particularly preferably from 15 to 30 mol %, to the total units contained in the polymer (S).

The polymer (S) may contain only one type, or two or more types, of the perfluoromonomer-based units. When two or more types are contained, the above content means the total amount of them.

The polymer (S) may further contain units based on tetrafluoroethylene (TFE).

The content of the units based on tetrafluoroethylene is preferably from 50 to 90 mol %, more preferably from 60 to 85 mol %, particularly preferably from 65 to 80 mol %, to the total units contained in the polymer (S).

The polymer (S) may contain units other than the above-mentioned ones (hereinafter referred to also as "other units"). Specific examples of such other units are the same as other units in the polymer (H).

The ion exchange capacity of the polymer (S) is preferably from 0.9 to 2.5 meq/g dry resin, more preferably from 1.1 to 2.4 meq/g dry resin, particularly preferably from 1.2 to 2.3 meq/g dry resin.

When the ion exchange capacity is at least the lower limit value in the above range, the ionic conductivity of the polymer (S) will be high, whereby when the membrane electrode assembly is applied to a polymer electrolyte fuel cell, a sufficient battery power will be obtainable. When the ion exchange capacity is at most the upper limit value in the above range, it is possible to suppress swelling of the polymer (S) when it contains water, whereby the mechanical strength of the polymer electrolyte membrane will be increased. It is possible to suppress flooding of the polymer electrolyte fuel cell.

The ion exchange capacity of the polymer (S) is obtainable by the method as described in the section for Examples given later.

The TQ value of the precursor polymer (S) of the polymer (S) is preferably from 200 to 350° C., more preferably from 210 to 340° C., particularly preferably from 220 to 330° C.

When the TQ value is at least the lower limit value in the above range, the polymer (S) will have a sufficient molecular weight and will be excellent in mechanical strength. When the TQ value is at most the upper limit value in the above range, the solubility or dispersibility of the polymer (S) will be improved, whereby it will be easier to prepare a liquid composition containing the polymer (S).

The TQ value of the precursor polymer (S) is measured by the method described in the section for Examples given later.

(Method for Producing Polymer (S))

The polymer (S) is produced, for example, by converting the precursor groups of a polymer obtained by polymerizing a monomer having a precursor group ($—SO_2F$ group) for a sulfonic acid-type functional group to sulfonic acid-type functional groups.

Specific examples of the monomer which can be used in the production of the polymer (S) may be the monomer (m31), monomer (m32), monomer (m41), tetrafluoroethylene, perfluoro(3-butenyl vinyl ether), perfluoro(allyl vinyl ether) perfluoro(allyl vinyl ether), perfluoro-α-olefins (such as hexafluoropropylene, etc.), and perfluoro(alkyl vinyl ethers) as exemplified in the method for producing the polymer (H).

The method for converting the precursor groups for sulfonic acid-type functional groups to the sulfonic acid-type functional groups is the same as the method for producing the polymer (H).

<Other Components>

The polymer electrolyte membrane 15 may contain at least one type of atoms selected from the group consisting of cerium and manganese in order to further improve the durability. Cerium and manganese will decompose hydrogen peroxide, which is a substance that causes degradation of the polymer electrolyte membrane 15. Cerium and manganese exist in the polymer electrolyte membrane 15 preferably in the form of ions, but they may also exist in the form of an insoluble salt such as cerium oxide.

The polymer electrolyte membrane 15 may contain silica and a heteropoly acid (zirconium phosphate, phosphomolybdic acid, phosphotungstic acid, etc.) as a water retention agent to prevent drying.

<Method for Forming Polymer Electrolyte Membrane>

The polymer electrolyte membrane 15 may be formed, for example, by a method (casting method) of applying a liquid composition containing the polymer (S) onto a base film or catalyst layer 11 and drying it.

The liquid composition is a dispersion having the polymer (S) dispersed in a solvent containing at least one of an organic solvent and water.

[Method for Producing Membrane Electrode Assembly]

The membrane electrode assembly 10 is produced, for example, by the following method.

(i) A method of forming catalyst layers 11 on a polymer electrolyte membrane 15 to form a membrane catalyst layer assembly, and sandwiching the membrane catalyst layer assembly by gas diffusion layers 12. (ii) A method of forming the catalyst layer 11 on a gas diffusion layer 12 to form the electrodes (anode 13 and cathode 14), and sandwiching a polymer electrolyte membrane 15 between the electrodes.

EXAMPLES

Hereinafter, the invention will be described in detail with reference to Examples. Ex. 1 and 2 are Examples of the present invention, and Ex. 3 is a Comparative Example. However, the present invention is not limited to these Examples.

[Proportions of the Respective Units]

The proportions of the respective units in a polymer were obtained from the results of $^{19}F$-NMR measurements of the polymer.

[Ion Exchange Capacity]

The ion exchange capacity of each polymer having $—SO_3H$ groups was obtained by the following method.

The polymer was put in a glove box and left and dried in an atmosphere with dry nitrogen flowing for at least 24 hours. The dry mass of the polymer was measured in the glove box.

The polymer was immersed in a 2 mol/L (liter) sodium chloride aqueous solution, left at 60° C. for 1 hour, and then cooled to room temperature. The ion exchange capacity of the polymer was obtained by titrating the sodium chloride aqueous solution in which the polymer was immersed, with a 0.5 mol/L sodium hydroxide aqueous solution.

[TQ Value]

Using a flow tester CFT-500A (manufactured by Shimadzu Corporation) equipped with a nozzle of 1 mm in length and 1 mm in inner diameter, the extrusion amount of the precursor polymer was measured by changing the temperature under the condition of an extrusion pressure of 2.94 MPa, and the temperature (TQ value) at which the extrusion amount reached 100 mm$^3$/sec was obtained.

[Liquid for Forming Anode Catalyst Layer]

To 44 g of a supported catalyst (TEC10E50E, manufactured by Tanaka Kikinzoku Kogyo K.K.) having 46 mass % of platinum supported on carbon powder, 217.8 g of water and 178.2 g of ethanol were added, and mixed and pulverized by using an ultrasonic homogenizer to obtain a dispersion of the catalyst. To the dispersion of the catalyst, 117.4 g of a mixed liquid prepared by preliminarily mixing and kneading 80.16 g of a dispersion (hereinafter referred to also as "dispersion X") in which a polymer (ion exchange capacity: 1.10 meq/g dry resin, TQ value of precursor polymer: 230° C.) obtained by copolymerizing TFE and monomer (m31-2-1) and made into acid form through hydrolysis and acid treatment, is dispersed in a solvent of water/ethanol=40/60 (mass %) at a solid content concentration of 25.8%, 44.4 g of ethanol and 25.32 g of Zeorora-H (manufactured by Zeon Corporation), was added, and further, 163.42 g of water and 139.12 g of ethanol were added and mixed by using an ultrasonic homogenizer to adjust the solid content concentration to be 7 mass % to obtain a coating liquid for forming an anode catalyst layer.

$CF_2$=$CFOCF_2CF(CF_3)OCF_2CF_2SO_2F$ (m31-2-1)

[Liquid for Forming Cathode Catalyst Layer]
<Production of Polymer (H-1)>

Into a stainless steel autoclave having an internal volume of 230 mL, 133.16 g of monomer (m32-1), 32.67 g of monomer (m22-1) and 14.1 g of a solvent (Asahiklin (registered trademark) AC-2000, manufactured by AGC Inc.) were charged and sufficiently deaerated under cooling with liquid nitrogen. 3.94 g of TFE (tetrafluoroethylene) was charged; the temperature was raised to 24° C.; 40.17 mg of radical polymerization initiator $((C_3F_7COO)_2)$ dissolved in a solvent $(CClF_2CF_2CHClF)$ at a concentration of 2.8 mass % was charged; the charging line was washed with 1.1 g of AC-2000; and the reaction was initiated. After stirring for 8 hours, the reaction was stopped by cooling the autoclave.

After diluting the product with AC-2000, it was mixed with a mixed liquid of AC-2000:methanol=8:2 (mass ratio), whereby the polymer was flocculated and filtered. In a mixture of AC-2000:methanol=7:3 (mass ratio), the polymer was washed, and after separation by filtration, the solid content was dried at 80° C. overnight under reduced pressure to obtain polymer (H'-1).

The obtained polymer (H'-1) was immersed in an aqueous solution containing 20 mass % methanol and 15 mass % potassium hydroxide at 50° C. for 40 hours, whereby $-SO_2F$ groups in the polymer (H'-1) were hydrolyzed and converted to $-SO_3K$ groups. Then, the polymer was immersed in a 3 mol/L hydrochloric acid aqueous solution for 2 hours at room temperature. The hydrochloric acid aqueous solution was replaced, and the same treatment was repeated four more times to obtain polymer (H-1) having the $-SO_3K$ groups in the polymer converted to sulfonic acid groups.

The composition of the constituent units constituting the polymer (H'-1) was analyzed by $^{19}F$-NMR, whereby it was found that in the polymer (H-1), the content of units based on monomer (m22-1) was 67 mol %, the content of units based on monomer (m32-1) was 18 mol %, and the content of units based on TFE was 15 mol %, to the total units contained in the polymer (H-1).

Further, the TQ value of the polymer (H'-1) was 275° C.

Further, the ion exchange capacity of the polymer (H-1) was obtained and found to be 1.23 meq/g dry resin.

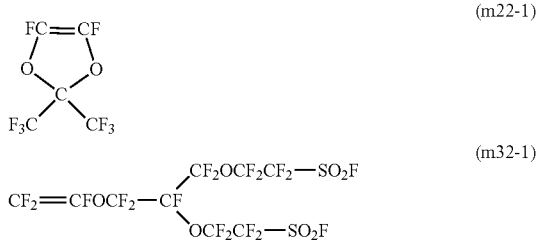

<Preparation of Liquid for Forming Catalyst Layer for Cathode>

The polymer (H-1) and a mixed solvent of water and 1-propanol (water/1-propanol=50/50 mass ratio) were stirred in a Hastelloy autoclave at 115° C. for 8 hours at a rotation speed of 150 rpm. A dispersion was prepared in which the concentration of polymer (H-1) was 18 mass %.

By adding 49.5 g of ultrapure water and 40.5 g of ethanol to 10 g of a catalyst (TEC10E50E, manufactured by Tanaka Kikinzoku Kogyo K.K.) supported so that 46 mass % platinum is contained in carbon powder, followed by irradiation with ultrasonic waves for 10 minutes, a dispersion of the catalyst was prepared. To this, 20.4 g of the above dispersion of the polymer (H-1) was added, and the mass ratio of the polymer (H-1) to catalytic carbon (mass of polymer (H-1)/mass of catalytic carbon) was set to be 0.8, and then 20.8 g of ultrapure water and 29.8 g of ethanol were further added to bring the solid content concentration to be 8 mass % to obtain a liquid for forming cathode catalyst layer.

[Polymer Electrolyte Membrane 1]

By copolymerizing $CF_2=CF_2$ with the above monomer (m32-1), polymer (S'-1) (ion exchange capacity: 1.95 meq/g dry resin, TQ value: 236° C.) was obtained.

The polymer (S'-1) was formed by melt extrusion to obtain a membrane (thickness: 200 μm) made of the polymer (S'-1).

Here, the ion exchange capacity shown in parentheses for the polymer (S'-1) represents the ion exchange capacity of the polymer obtainable at the time when hydrolyzed in the procedure as described later.

The membrane was immersed in an aqueous solution containing 20 mass % of potassium hydroxide for 16 hours to hydrolyze the $-SO_2F$ groups in the polymer (S'-1) and convert them to $-SO_3K$ groups. The membrane was immersed in a 3 mol/L hydrochloric acid aqueous solution for 2 hours. The hydrochloric acid aqueous solution was replaced, and the same treatment was repeated four more times to convert the $-SO_3K$ groups in the polymer to sulfonic acid groups to obtain the membrane-like polymer (S-1).

Using the polymer (S-1), a dispersion (hereinafter referred to also as "dispersion Y1") having it dispersed in a solvent of water/ethanol=50/50 (mass %) at a solid content concentration of 13%, was obtained.

Next, a porous material 1 (manufactured by Donaldson Company, Inc., product name "Tetratex II 3108", thickness: 20 μm, average pore diameter: 3 μm, stretched porous PTFE film) was impregnated with the dispersion Y1 to obtain a 20 μm polymer electrolyte membrane 1.

[Polymer Electrolyte Membrane 2]
(Synthesis of Compound 2-1)

Into a 2 L four-necked flask equipped with a stirrer, a condenser, a thermometer and a dropping funnel, 560 g of chlorosulfonic acid was charged under sealing with nitrogen gas. The flask was cooled in an ice bath, and while the internal temperature was maintained to be at most 20° C., a mixed liquid of 139.5 g of compound 1-1 and 478.7 g of dichloromethane was dropwise added over a period of 20 minutes. During the dropwise addition, heat generation and gas generation were observed. After the dropwise addition was completed, the flask was set in an oil bath, and the reaction was conducted for 7 hours while the internal temperature was maintained at from 30 to 40° C. The reaction proceeded with the generation of gas, and a white solid was precipitated. After the reaction, the dichloromethane was removed by reducing the pressure in the flask. In the flask, a white solid with a yellowish tinge remained. The solid was analyzed by $^1H$-NMR, whereby it was confirmed that compound 2-1 had been formed.

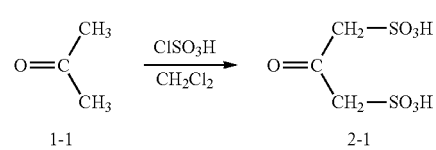

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C=O).

(Synthesis of Compound 3-1)

Compound 2-1 obtained in Ex. 1-1 was used directly in the following reaction without being isolated. In the flask in Ex. 1-1, 2,049 g of thionyl chloride was added. The flask was heated to 80° C. and refluxed for 15 hours. Along with the progress of the reaction, the reflux temperature increased from 52° C. to 72° C. During the reaction, generation of gas was observed. The point at which compound 2-1 was all dissolved and the gas generation terminated, was taken as the end point of the reaction. The reaction solution was transferred to a 2 L separable flask and left to cool for 9 hours while the gas phase was sealed with nitrogen gas, whereby a dark brown solid precipitated in the separable flask. Unreacted thionyl chloride was removed by decantation. Toluene was added to wash the precipitated solid, and toluene was again removed by decantation. The toluene washing was carried out three times in total, and the total amount of toluene used was 1,207 g. The precipitated solid was dried at 25° C. for 71 hours under a nitrogen gas stream. The solid after the drying was collected and analyzed by $^1$H-NMR, whereby it was confirmed that 356.5 g of compound 3-1 having a purity of 96.2% was obtained. The yield based on compound 1-1 became to be 56.0%.

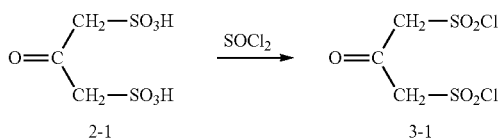

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C=O).

(Synthesis of Compound 4-1)

Into a 1 L four-necked flask equipped with a stirrer, a condenser and a thermometer, 90.0 g of compound 3-1 and 750 mL of acetonitrile were charged under sealing with nitrogen gas. The flask was cooled in an ice bath, and with stirring, 110.3 g of potassium hydrogen fluoride was added. The heat generated by the addition was slight. The ice bath was replaced by a water bath, and the reaction was conducted for 62 hours while the internal temperature was maintained at from 15 to 25° C. Along with the reaction, a fine white solid was formed. The reaction solution was transferred to a pressurized filter and the unreacted potassium hydrogen fluoride and product were separated by filtration. Acetonitrile was added to the filter, and the filtered solid was washed until the filtrate became clear, and the washing solution was collected. The filtrate and washing solution were passed through an evaporator to remove the acetonitrile. To the solid remaining after dry-solidification, 950 mL of toluene was added, followed by heating to 100° C. to let the solid be dissolved in toluene. The dissolved solution was spontaneously filtered to remove the undissolved portion. The filtrate was transferred to a 1 L separable flask and left to cool for 14 hours while sealing the gas phase with nitrogen gas, whereby light brown needle-like crystals precipitated in the separable flask. The crystals were washed with toluene and dried at 25° C. for 30 hours under a nitrogen gas stream. The solid after drying was recovered and analyzed by $^1$H-NMR and $^{19}$F-NMR, whereby it was confirmed that 58.1 g of compound 4-1 having a purity of 97.6% was obtained. The yield based on compound 3-1 was 72.3%.

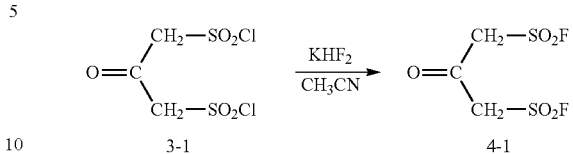

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

(Synthesis of Compound 5-1)

Into a 200 mL nickel autoclave, 9.93 g of compound 4-1 and 89.7 g of acetonitrile were charged. The autoclave was cooled, and the reaction solution was bubbled for 1 hour by feeding nitrogen gas at a flow rate of 6.7 L/hr while maintaining the internal temperature at from 0 to 5° C. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr for 6 hours. Nitrogen gas was again fed at a flow rate of 6.7 L/hr, and the reaction solution was bubbled for 1 hour. 103.2 g of the reaction solution was recovered from the autoclave. The reaction solution was quantitatively analyzed by $^{19}$F-NMR, whereby it was confirmed that 8.4 mass % of compound 5-1 was contained. The reaction yield based on compound 4-1 became to be 66%.

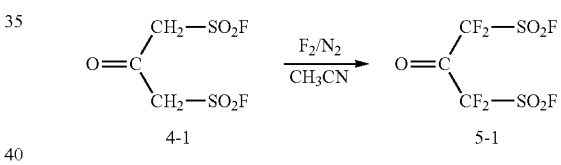

NMR spectrum of Compound 5-1:
$^{19}$F-NMR: −104.1 ppm (—CF$_2$—, 4F, s), 45.8 ppm (—SO$_2$F, 2F, s).

(Synthesis of Monomer (m41-1))

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, and while the internal temperature was kept at from 0 to 10° C. with stirring, 8.43 g of the reaction solution obtained in the synthesis of compound 5-1 was dropwise added by using a plastic syringe. Strong heat generation was observed, and the dropwise addition took 15 minutes. After completion of the dropwise addition, the ice bath was replaced with a water bath, and the reaction was conducted at from 15 to 20° C. for 1 hour. While cooling again in an ice bath to maintain the temperature of the reaction solution at from 0 to 10° C., 6.56 g of compound 6-1 was dropwise added from the dropping funnel. After completion of the dropwise addition, the ice bath was replaced with a water bath, and the reaction was conducted at from 20 to 25° C. for 3.5 hours. By suction filtration, a byproduct solid was removed from the reaction solution, and the filtrate was recovered. The filtered solid was washed with a suitable amount of acetonitrile, and the washing solution was mixed with the filtrate. 37.1 g of the filtrate was quantitatively analyzed by $^{19}$F-NMR, whereby it was confirmed that monomer (m41-1) was contained in 2.04 mass %. The reaction yield on the basis of compound 4-1 became to be 46.6%.

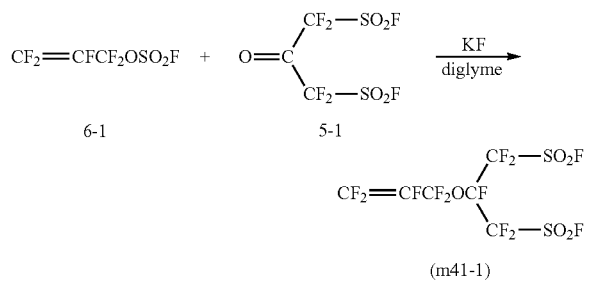

NMR Spectrum of Monomer (m41-1):
$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

(Synthesis of Polymer (S'-2))

Into an autoclave (internal volume: 100 mL, stainless steel), 82.0 g of the monomer (m41-1) was put, and cooled and degassed with liquid nitrogen. It was heated in an oil bath until the internal temperature reached 100° C. The pressure at that time was 0.25 MPaG (gauge pressure). A mixed liquid of 42.3 mg of a polymerization initiator (((CF$_3$)$_3$COOC(CF$_3$)$_3$) and 4.18 g of a solvent (CF$_3$(CF$_2$)$_5$H) was injected into the autoclave. Further, from an injection line, nitrogen gas was introduced to completely inject the injected liquid in the injection line. By this operation, TFE in the gas phase was diluted, and as a result, the pressure increased to 0.49 MPaG. While maintaining the pressure at 0.49 MPaG, TFE was continuously added to carry out the polymerization. When the amount of TFE added reached 6.49 g in 10.0 hours, inside of the autoclave was cooled down to stop the polymerization, and the gas in the system was purged. After diluting the reaction solution with a solvent (CF$_3$(CF$_2$)$_5$H), a solvent (CF$_3$CH$_2$OCF$_2$CF$_2$H) was added to precipitate and filter the polymer. Then, the operation of stirring the polymer in the solvent (CF$_3$(CF$_2$)$_5$H) and reprecipitating it with the solvent (CF$_3$CH$_2$OCF$_2$CF$_2$H) was repeated twice. By vacuum drying at 120° C., polymer (S'-2) being a copolymer of TFE and monomer (m41-1), was obtained.

In the polymer (S'-2), the content of units based on monomer (m41-1) was 14.1 mol % to all units contained in the polymer (S'-2).

Further, of the polymer (S'-2), the TQ value was 314° C. and the glass transition temperature (Tg) was 39° C.

Further, the ion exchange capacity of the polymer (S'-2) means the ion exchange capacity of the polymer after hydrolysis treatment as follows. First, the membrane of the polymer (S'-2) as described below was vacuum dried at 120° C. for 12 hours. Then, after measuring the mass of the membrane of the polymer after the drying, the membrane of the polymer was hydrolyzed by immersing it in a 0.85 mol/g sodium hydroxide solution (solvent: water/methanol=10/90 (mass ratio)) at 60° C. for at least 72 hours. Thus, polymer (S-2) having the precursor groups of the polymer (S'-2) converted to sulfonic acid groups was obtained. The ion exchange capacity of the polymer (S-2), measured by the method as described above, was 1.90 meq/g dry resin.

(Production of Polymer Electrolyte Membrane 2)

A dispersion (hereinafter referred to also as "dispersion Y2") having the polymer (S-2) dispersed in a solvent of water/ethanol=37/63 (mass %) at a solid content concentration of 11%, was impregnated to the above-mentioned porous material 1, to obtain a polymer electrolyte membrane 2 having a thickness of 20 μm.

[Polymer Electrolyte Membrane 3]

A polymer electrolyte membrane 3 having a thickness of 20 μm was prepared by the casting method using the dispersion Y1 without using the porous material 1.

[Ex. 1]

The liquid for forming an anode catalyst layer was applied to one surface of the polymer electrolyte membrane 1 by a bar coater, dried at 80° C. for 10 minutes, and then subjected to heat-treatment at 150° C. for 15 minutes to obtain an electrolyte membrane provided with an anode catalyst layer having a platinum amount of 0.1 mg/cm$^2$.

Next, a cathode catalyst ink was applied to an ETFE sheet by a die coater, dried at 80° C., and further subjected to heat-treatment at 150° C. for 15 minutes to obtain a cathode catalyst layer decal having a platinum amount of 0.1 mg/cm$^2$.

By letting the surface of the electrolyte membrane provided with an anode catalytic layer, on which the anode catalyst layer was not formed, and the surface of the cathode catalytic layer decal, on which the catalyst layer was formed, to face each other, and heat pressing them under the conditions of a pressing temperature of 150° C. for a pressing time of 2 minutes and a pressure of 3 MPa, to bond the electrolyte membrane provided with an anode catalyst layer and the cathode catalyst layer, and after lowering the temperature to 70° C., the pressure was released, followed by taking the assembly out, and the ETFE sheet of the cathode catalyst layer decal was peeled off to obtain a membrane electrode assembly in Ex. 1 having an electrode area of 25 cm$^2$.

[Ex. 2]

A membrane electrode assembly in Ex. 2 was obtained in the same manner as in Ex. 1, except that the polymer electrolyte membrane 2 was used instead of the polymer electrolyte membrane 1.

[Ex. 3]

The membrane electrode assembly in Ex. 3 was obtained in the same manner as in Ex. 1, except that the polymer electrolyte membrane 3 was used instead of the polymer electrolyte membrane 1.

[Evaluation Test]

<Cracking of Cathode Catalyst Layer>

The wet-dry cycling test was conducted by the following method in accordance with the method as described in Yeh-Hung Lai, Cortney K. Mittelsteadt, Craig S. Gittleman, David A. Dillard, "VISCOELASTIC STRESS MODEL AND MECHANICAL CHARACTERIZATION OF PERFLUOROSULFONIC ACID(PFSA)POLYMER ELECTROLYTE MEMBRANES", Proceedings of FUELCELL2005, Third International Conference on Fuel Cell Science, Engineering and Technology, FUELCELL2005, (2005), 74120.

The membrane electrode assembly obtained in each Ex. was incorporated into a cell for power generation (electrode area: 25 cm$^2$), and at a cell temperature of 80° C., nitrogen gas was supplied to each of the anode and cathode at a rate of 1 L/min. The process of supplying nitrogen gas with 150% RH humidity for 2 minutes and then supplying nitrogen gas with 0% RH humidity for 2 minutes was repeated, as one cycle.

After 10,000 cycles, the presence or absence of cracks in the cathode catalyst layer in the membrane electrode assembly was checked by a digital microscope (VHX-5000, manufactured by Keyence) and evaluated in accordance with the following standards. The evaluation results are shown in Table 1.

◯: Six fields of view were observed at a magnification of 300 times, and the area occupied by cracks was less than 10%.

x: Six fields of view were observed at magnification of 300 times, and the area occupied by cracks was at least 10%.

TABLE 1

| | | Ex. 1 | Ex. 2 | Ex. 3 |
|---|---|---|---|---|
| Polymer electrolyte membrane | Type | 1 | 2 | 3 |
| | Ion exchange capacity of polymer (meq/g dry resin) | 1.95 | 1.90 | 1.95 |
| | TQ value of precursor polymer (° C.) | 236 | 314 | 236 |
| Cathode catalyst layer | Ion exchange capacity of polymer (meq/g dry resin) | 1.23 | 1.23 | 1.23 |
| | TQ value of precursor polymer (° C.) | 275 | 275 | 275 |
| Evaluation results | Cracks in cathode catalyst layer | ◯ | ◯ | x |

As shown in Table 1, in a case where a proton-conductive polymer in the catalytic layer of at least one of the anode and the cathode has units containing a cyclic ether structure and has sulfonic acid-type functional groups, it has been confirmed that cracking of the catalyst layer in the membrane electrode assembly can be suppressed by using the polymer electrolyte membrane containing a porous material containing a fluorinated polymer, and a fluorinated polymer having sulfonic acid-type functional groups (Ex. 1 and 2).

REFERENCE SYMBOLS

10: Membrane electrode assembly
11: Catalyst layer
12: Gas diffusion layer
13: Anode
14: Cathode
15: Polymer electrolyte membrane The entire contents of the specification, claims, drawings, and abstract of Japanese Patent Application No. 2019-046159, filed on Mar. 13, 2019, are hereby cited and incorporated as disclosure in the specification of the present invention.

This application is a continuation of PCT Application No. PCT/JP2020/010940, filed on Mar. 12, 2020, which is based upon and claims the benefit of priority from Japanese Patent Application No. 2019-046159, filed on Mar. 13, 2019. The contents of those applications are incorporated herein by reference in their entireties.

What is claimed is:

1. A membrane electrode assembly comprising an anode having a catalyst layer containing a proton-conductive polymer and a catalyst, a cathode having a catalyst layer containing a proton-conductive polymer and a catalyst, and a polymer electrolyte membrane disposed between the anode and the cathode, characterized in that
the proton-conductive polymer contained in said catalyst layer of at least one of said anode and said cathode is a polymer (H) having units containing a cyclic ether structure and having sulfonic acid-type functional groups, and
the polymer electrolyte membrane contains a porous material containing a fluorinated polymer, and a fluorinated polymer (S) having sulfonic acid-type functional groups.

2. The membrane electrode assembly according to claim 1, wherein the units containing a cyclic ether structure include at least one type of units selected from the group consisting of units represented by the formula (u12) and units represented by the formula (u22):

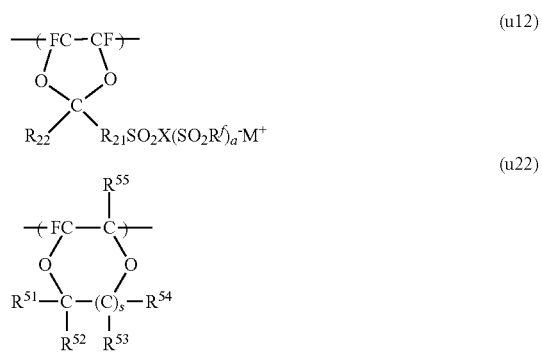

in the formula (u12), $R^{21}$ is a $C_{1-6}$ perfluoroalkylene group or a $C_{2-6}$ perfluoroalkylene group having an ether-bonding oxygen atom between carbon-carbon atoms; $R^{22}$ is a fluorine atom, a $C_{1-6}$ perfluoroalkyl group, a $C_{2-6}$ perfluoroalkyl group having an ether-bonding oxygen atom between carbon-carbon atoms, or a group represented by $-R^{21}(SO_2X(SO_2R^f)_a)^-M^+$, where $M^+$ is $H^+$, a monovalent metal cation, or an ammonium ion in which at least one hydrogen atom may be substituted with a hydrocarbon group; $R^f$ is a linear or branched perfluoroalkyl group which may have an ether-bonding oxygen atom; and X is an oxygen atom, a nitrogen atom, or a carbon atom, provided that when X is an oxygen atom, a=0, when X is a nitrogen atom, a=1, and when X is a carbon atom, a=2;

in the formula (u22), s is 0 or 1; $R^{51}$ and $R^{52}$ are each independently a fluorine atom, a $C_{1-5}$ perfluoroalkyl group, or a spiro ring formed by linking of them together (but when s is 0); $R^{53}$ and $R^{54}$ are each independently a fluorine atom or a $C_{1-5}$ perfluoroalkyl group; and $R^{55}$ is a fluorine atom, a $C_{1-5}$ perfluoroalkyl group, or a $C_{1-5}$ perfluoroalkoxy group.

3. The membrane electrode assembly according to claim 1, wherein the content of the units containing a cyclic ether structure is at least 30 mol % to the total units which the polymer (H) contains.

4. The membrane electrode assembly according to claim 1, wherein the ion exchange capacity of the polymer (H) is from 0.9 to 1.8 meq/g dry resin.

5. The membrane electrode assembly according to claim 1, wherein the TQ value of a precursor polymer (H) which is a polymer in which the sulfonic acid-type functional groups in the polymer (H) are groups which can be converted to sulfonic acid-type groups, is from 200 to 300° C.:

TQ value: It is the temperature at which the extrusion amount becomes 100 mm³/sec when the precursor polymer (H) is melt-extruded under the condition of 2.94 MPa extrusion pressure by using a nozzle with a length of 1 mm and an inner diameter of 1 mm.

6. The membrane electrode assembly according to claim 1, wherein the fluorinated polymer (S) has at least one type of units selected from the group consisting of units represented by the formula (u31), units represented by the formula (u32) and units represented by the formula (u41):

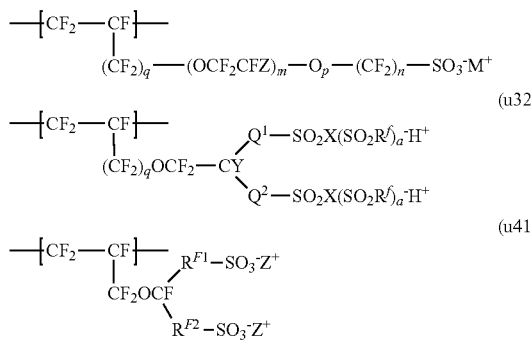

in the formula (u31), Z is a fluorine atom or a trifluoromethyl group; q is 0 or 1; m is an integer of from 0 to 3; p is 0 or 1; n is an integer of from 1 to 12; m+p>0; and $M^+$ is $H^+$, a monovalent metal cation, or an ammonium ion in which at least one hydrogen atom may be substituted with a hydrocarbon group;

in the formula (u32), $Q^1$ is a perfluoroalkylene group which may have an ether-bonding oxygen atom; $Q^2$ is a single bond or a perfluoroalkylene group which may have an ether-bonding oxygen atom; Y is a fluorine atom or a monovalent perfluoroorganic group; q is 0 or 1; $R^f$ is a linear or branched perfluoroalkyl group which may have an ether-bonding oxygen atom; and X is an oxygen atom, a nitrogen atom or a carbon atom, provided that when X is an oxygen atom, a in $(SO_2R^f)_a$ bonded to X is 0, when X is a nitrogen atom, a in $(SO_2R^f)_a$ bonded to X is 1, and when X is a carbon atom, a in $(SO_2R^f)_a$ bonded to X is 2, and when two or more $R^f$, a and X are contained, the two or more $R^f$, a and X may be the same or different from each other;

in the formula (u41), $R^{F1}$ and $R^{F2}$ are each independently a $C_{1-3}$ perfluoroalkylene group; and $Z^+$ is $H^+$, a monovalent metal cation, or an ammonium ion in which at least one hydrogen atom may be substituted with a hydrocarbon group, and the two $Z^+$ may be the same or different from each other.

7. The membrane electrode assembly according to claim 1, wherein the ion exchange capacity of the fluorinated polymer (S) is from 0.9 to 2.5 meq/g dry resin.

8. The membrane electrode assembly according to claim 1, wherein the TQ value of a precursor polymer (S) which is a polymer in which the sulfonic acid-type functional groups in the fluorinated polymer (S) are groups which can be converted to sulfonic acid-type groups, is from 200 to 350° C.:

TQ value: It is the temperature at which the extrusion amount becomes 100 mm³/sec when the precursor polymer (S) is melt-extruded under the condition of 2.94 MPa extrusion pressure by using a nozzle with a length of 1 mm and an inner diameter of 1 mm.

9. The membrane electrode assembly according to claim 1, wherein the form of the porous material is a woven fabric, a non-woven fabric, a foam or a film.

10. The membrane electrode assembly according to claim 1, wherein the fluorinated polymer contained in the porous material is at least one member selected from the group consisting of polytetrafluoroethylene, a tetrafluoroethylene-hexafluoropropylene copolymer, and a tetrafluoroethylene-perfluoro(alkyl vinyl ether) copolymer.

11. The membrane electrode assembly according to claim 1, wherein the average pore diameter of the porous material is from 0.01 and 500 μm.

12. The membrane electrode assembly according to claim 1, wherein the average thickness of the porous material is from 1 and 300 μm.

13. The membrane electrode assembly according to claim 1, wherein the polymer (H) has units based on a perfluoromonomer and/or units based on tetrafluoroethylene (TFE).

14. The membrane electrode assembly according to claim 1, wherein the polymer (S) has units based on a perfluoromonomer and/or units based on tetrafluoroethylene (TFE).

15. The membrane electrode assembly according to claim 1, which is to be used in a polymer electrolyte fuel cell.

* * * * *